United States Patent
Cordeiro (10) Patent No.: US 8,503,359 B2
(45) Date of Patent: Aug. 6, 2013

(54) USE OF DELAYED CLEAR-TO-SEND AND DENIAL-TO-SEND IN DIRECTIONAL WIRELESS NETWORKS

(75) Inventor: Carlos Cordeiro, Portland, OR (US)

(73) Assignee: Intel Corporation, Santa Clara, CA (US)

(*) Notice: Subject to any disclaimer, the term of this patent is extended or adjusted under 35 U.S.C. 154(b) by 396 days.

(21) Appl. No.: 12/459,151

(22) Filed: Jun. 26, 2009

(65) Prior Publication Data

US 2010/0329178 A1    Dec. 30, 2010

(51) Int. Cl.
*H04W 4/00* (2009.01)
*H04W 84/12* (2009.01)
*H04W 84/18* (2009.01)

(52) U.S. Cl.
CPC .............. *H04W 84/12* (2013.01); *H04W 84/18* (2013.01)
USPC ........... 370/328; 370/278; 370/338; 370/455; 455/434

(58) Field of Classification Search
USPC .................. 370/328, 278, 338, 455; 455/434
See application file for complete search history.

(56) References Cited

U.S. PATENT DOCUMENTS

| | | |
|---|---|---|
| 2002/0184389 A1 | 12/2002 | Sherman |
| 2005/0105504 A1* | 5/2005 | Sakoda .......................... 370/349 |
| 2005/0254513 A1* | 11/2005 | Cave et al. ..................... 370/445 |
| 2006/0227802 A1* | 10/2006 | Du et al. ........................ 370/447 |
| 2006/0262759 A1 | 11/2006 | Bahl et al. |
| 2007/0002814 A1* | 1/2007 | Benveniste ................... 370/338 |
| 2008/0130519 A1 | 6/2008 | Bahl et al. |

FOREIGN PATENT DOCUMENTS

| | | |
|---|---|---|
| CN | 1842001 A | 10/2006 |
| CN | 101356775 A | 1/2009 |
| JP | 2003-163669 A | 6/2003 |
| JP | 2006-261984 A | 9/2006 |
| JP | 2008-546275 A | 12/2008 |
| KR | 10-2008-0021764 A | 3/2008 |
| WO | 2005/114867 A2 | 12/2005 |
| WO | 2010/151377 A2 | 12/2010 |
| WO | 2010/151377 A3 | 3/2011 |

OTHER PUBLICATIONS

International Search Report and Written Opinion received or PCT Patent Application No. PCT/US2010/033717, mailed on Dec. 28, 2010, 9 pages.
International Preliminary Report on Patentability and Written Opinion received for PCT Patent Application No. PCT/U62010/033717, mailed on Jan. 12, 2012, 7 pages.

(Continued)

*Primary Examiner* — Pao Sinkantarakorn
*Assistant Examiner* — Richard K Chang
(74) *Attorney, Agent, or Firm* — Sutherland Asbill & Brennan LLP (57) ABSTRACT

For directional wireless communications, at least one new response to a Request-to-Send (RTS) message has been created to avoid a hidden-node problem that is particular to directional networks. In response to an RTS received during a NAV period, a Denial-to-Send (DTS) may be transmitted to indicate that the responding device cannot currently communicate further because its NAV is currently set, but it will be ready to communicate after expiration of the time period specified in the DTS.

20 Claims, 5 Drawing Sheets

OTHER PUBLICATIONS

Office Action received for Chinese Patent Application No. 201010221476.X, mailed on Feb. 5, 2013, 8 pages of English Translation, 5 pages of Office Action and 2 pages of Search Report.

Office Action Received for Korean Patent Application No. 2011-7031026, mailed on Apr. 3, 2013, 5 pages of English Translation only.

Office Action Received for Japanese Patent Application No. 2012-516087, mailed on Apr. 2, 2013, 3 pages of English Translation and 3 pages of Office Action.

* cited by examiner

D-CTS

FIG. 4

DTS

USE OF DELAYED CLEAR-TO-SEND AND DENIAL-TO-SEND IN DIRECTIONAL WIRELESS NETWORKS

BACKGROUND

The popular Request-to-Send/Clear-to-Send (RTS/CTS) mechanism used in WiFi wireless networks provides numerous benefits, including mitigation of the hidden terminal problem and establishment of protection for the subsequent data exchange between two devices. Recently, the same RTS/CTS exchange has been proposed for mmWave (e.g., 60 GHz) communications, which are characterized by directional communications. However, due to the nature of directional transmissions and receptions, a new type of hidden terminal problem has been introduced which is not resolved by the standard RTS/CTS protocol. For example, when a first device has established a directional link with a second device in a direction that encompasses an unrelated third device, and detects an RTS from that third device, the first device knows to sets its Network Allocation Vector (NAV) so that it won't transmit during the time period specified in that RTS. However, when the directionality is such that the first device detects the RTS but the second device does not, the second device may transmit its own RTS to the first device, but the first device cannot transmit a CTS back because its own NAV was set by the first RTS. When the second device doesn't receive the expected CTS, it may initiate unneeded corrective action, such as repeating the RTS several times, and if it assumes the directional link has been lost, initiating a time consuming and unnecessary beam forming operation.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable storage medium, which may be read and executed by one or more processors to enable performance of the operations described herein. A computer-readable storage medium may include any mechanism for storing information in a form readable by one or more computers. For example, a computer-readable storage medium may include things such as, but not limited to, read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. A wireless device may comprise at least one antenna, at least one radio, and at least one processor, and at least one memory, where the radio transmits signals through the antenna that represent data and receives signals through the antenna that represent data, while the processor may process the data to be transmitted and the data that has been received. The processor may also process other data, which is neither transmitted nor received. For convenience of reference within this document, each wireless communications device may be labeled as a STA, but the various embodiments of the invention are not limited to devices identified with this label. Other common terms may also be used, such as but not limited to a mobile station, DEV, etc., and still fall within the scope of the embodiments of the invention.

Within the context of this document, a directional transmission means the transmission is relatively strong in one direction and relatively weak in the other directions, within the intended frequency band. A directional reception means the receiving device can receive signals from one direction more easily than it can receive equivalent strength signals from other directions, within the intended frequency band. Directional communications include both directional transmissions and directional receptions. A directional link means that two devices have established the parameters for directional transmission and directional reception in communications with each other.

Within the context of this document, a "Network Allocation Vector" (NAV) is a period of time that expires at a designated time indicated in a message. "Setting a NAV" means setting a timer to measure the period of time that will expire at the end of that NAV. "Expiration of the NAV" means expiration of the time period indicated with the timer.

Figure 1:
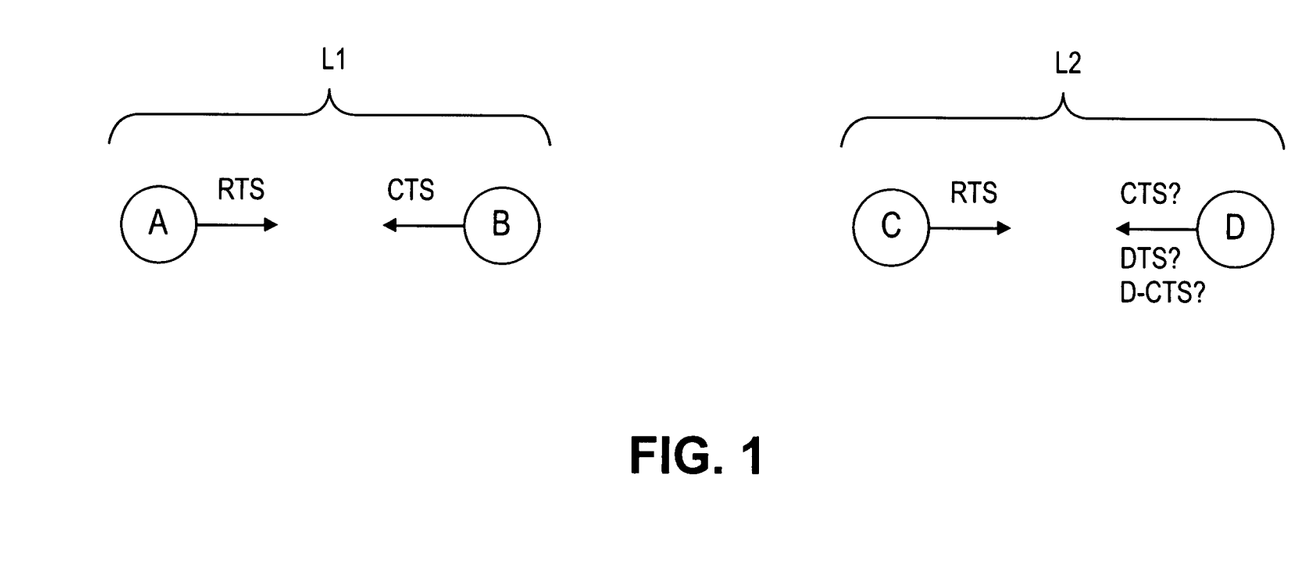
FIG. 1 shows two pair of wireless communication devices using directional links, according to an embodiment of the invention.

FIG. 1 shows two pair of wireless communication devices using directional links, according to an embodiment of the invention. In the illustrated embodiments, it is assumed that STA A and STA B have already established a directional link L1 with each other, and that STA C and STA D have already established a directional link L2 with each other, with each STA's transmissions and receptions being focused in the direction of the arrow. It is further assumed that the physical location of these STAs is such that directional transmissions from STA A will reach STAs C and D, and that STA D can receive these transmissions (because its receiver is directed towards STA A) but STA C cannot receive these transmissions (because its receiver is directed away from STA A).

In the example operation, STA A may transmit an RTS to STA B, which responds by transmitting a CTS to STA A. However, because of their respective locations and directionality, STA D may also detect this RTS. Since STA D was not addressed by the RTS from STA A, STA D may set its NAV for the time period specified in the RTS from STA A, and suspend transmitting during that time. (Note: in some protocols, both the RTS and CTS contain information indicating the time remaining in the NAV period. In such an instance STA D would set its NAV if it overheard either an RTS or a CTS from STA A. The NAV would expire at the same time either way.) Shortly afterwards, STA C (which did not detect the RTS from STA A and therefore does not know about the NAV) may transmit its own RTS to STA D. Without the interfering presence of link L1, STA D would normally respond by promptly transmitting a CTS back to STA C. But because of the earlier detection of an RTS from STA A, under conventional operations STA D should not respond promptly with a CTS because its NAV is still set. However, under the embodiments of the invention described herein, STA D can respond in a non-conventional way by transmitting either of two responses. Within this document, these responses are labeled a denial-to-send (DTS), which may sometimes be referred to as a mmWaveDTS, and a delayed clear-to-send (D-CTS), which may sometimes be referred to as a mmWaveCTS. A DTS response indicates that the device responding to the RTS has its NAV set, and that the NAV will expire at a time indicated by the DTS. By contrast, the time specified in a D-CTS may indicate the time remaining in the time period specified by the RTS to which the device is responding. In some embodiments, a D-CTS may be used in the same situations as a standard CTS (i.e., even if the response is not yet delayed), since both indicate an ability to immediately proceed with communications.

Figure 2:
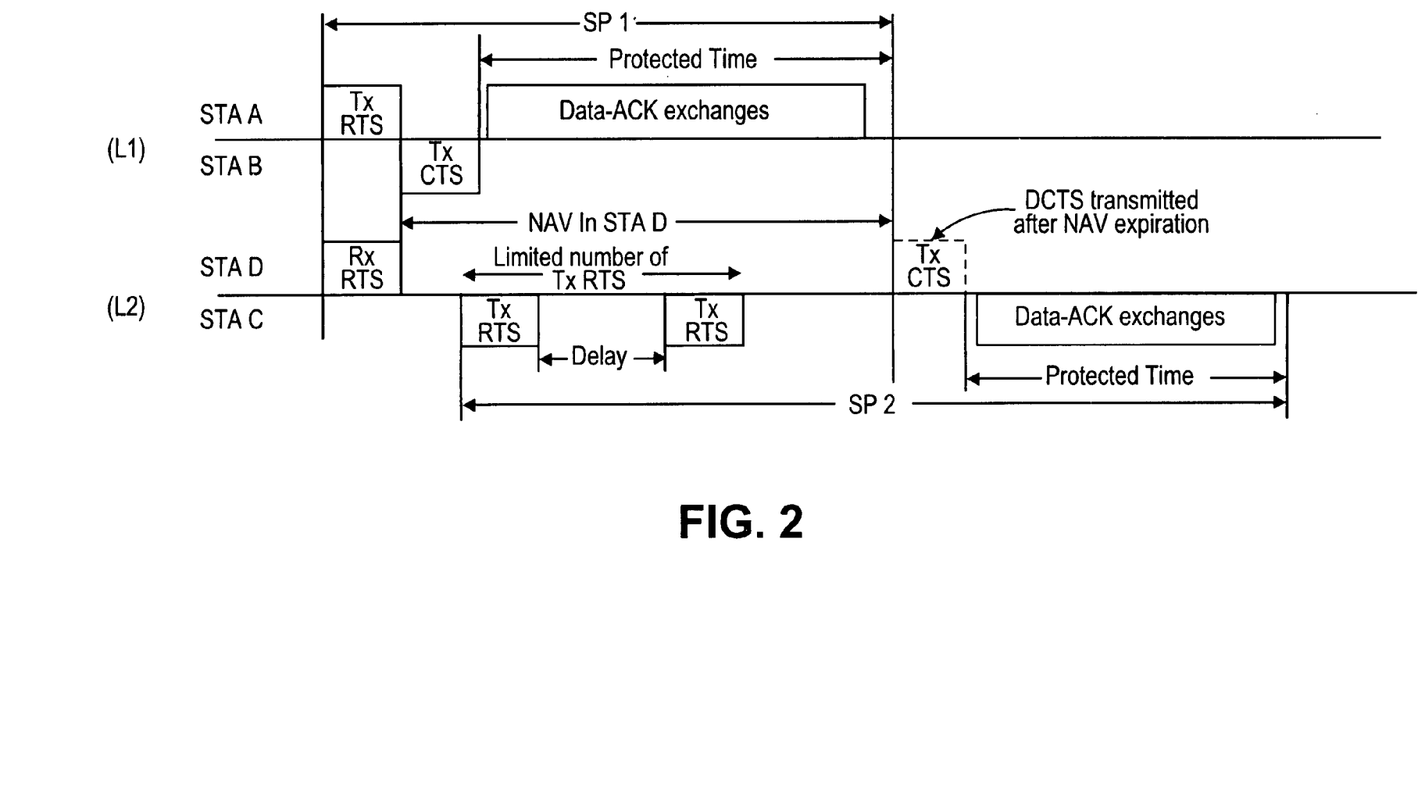
FIG. 2 shows a timing diagram of an exchange using a delayed clear-to-send, according to an embodiment of the invention.

FIG. 2 shows a timing diagram of an exchange using a delayed clear-to-send, according to an embodiment of the invention. Using the same scenario described for FIG. 1, during service period 1 (SP1) STA A transmits an RTS to STA B, which may respond by transmitting a standard CTS back to STA A. Either the RTS, or the CTS, or both, may be considered as making a network reservation, since the purpose of this exchange is to reserve the channel(s) for subsequent communication between these two devices. Once the RTS/CTS exchange has taken place, STA A and STA B may communicate with each other over their directional link L1, and might assume that their communications during SP1 are protected from interference because any devices that overheard the RTS/CTS exchange will know of the reservation.

As described earlier, STA D may set its NAV in response to detecting the RTS from STA A, that NAV to expire when SP1 expires. However, STA C did not detect the RTS from STA A, and may therefore feel free to transmit its own RTS to STA D, indicating that SP2 will be the duration of the expected subsequent exchanges between STA C and STA D. But STA D does not immediately respond with a CTS because STA D has its NAV set. STA C, after waiting for a predetermined period and not hearing a response from STA D, may retransmit the RTS. This delay and retransmit process may be repeated several times if STA D does not respond, although most communication standards specify a maximum number of such retries before giving up and taking another approach.

In the example of FIG. 2, the maximum number of retries is not reached. When STA D's NAV expires at the end of SP1, STA D may note that the time period specified for SP2 has not yet expired and therefore communication with STA C may still be possible. STA D then transmits a DCTS back to STA C, without waiting for another RTS. When STA C receives the DCTS, STA C and STA D may then perform the desired communication exchange during SP2, although the time remaining in SP2 for such communication has been reduced by the delay caused by the NAV.

The technique described in FIG. 2 has the advantage of not requiring STA D to violate its own NAV by transmitting when it is not supposed to. A disadvantage is that STA C has no information on why STA D is not responding, and may take corrective action that is not required, unless STA C is programmed not to take such corrective action before the expiration of time period SP1. If SP2 expires before SP1, it may be too late to initiate the desired communications between STA C and STA D, and these devices may take other actions not described here.

Figure 3:
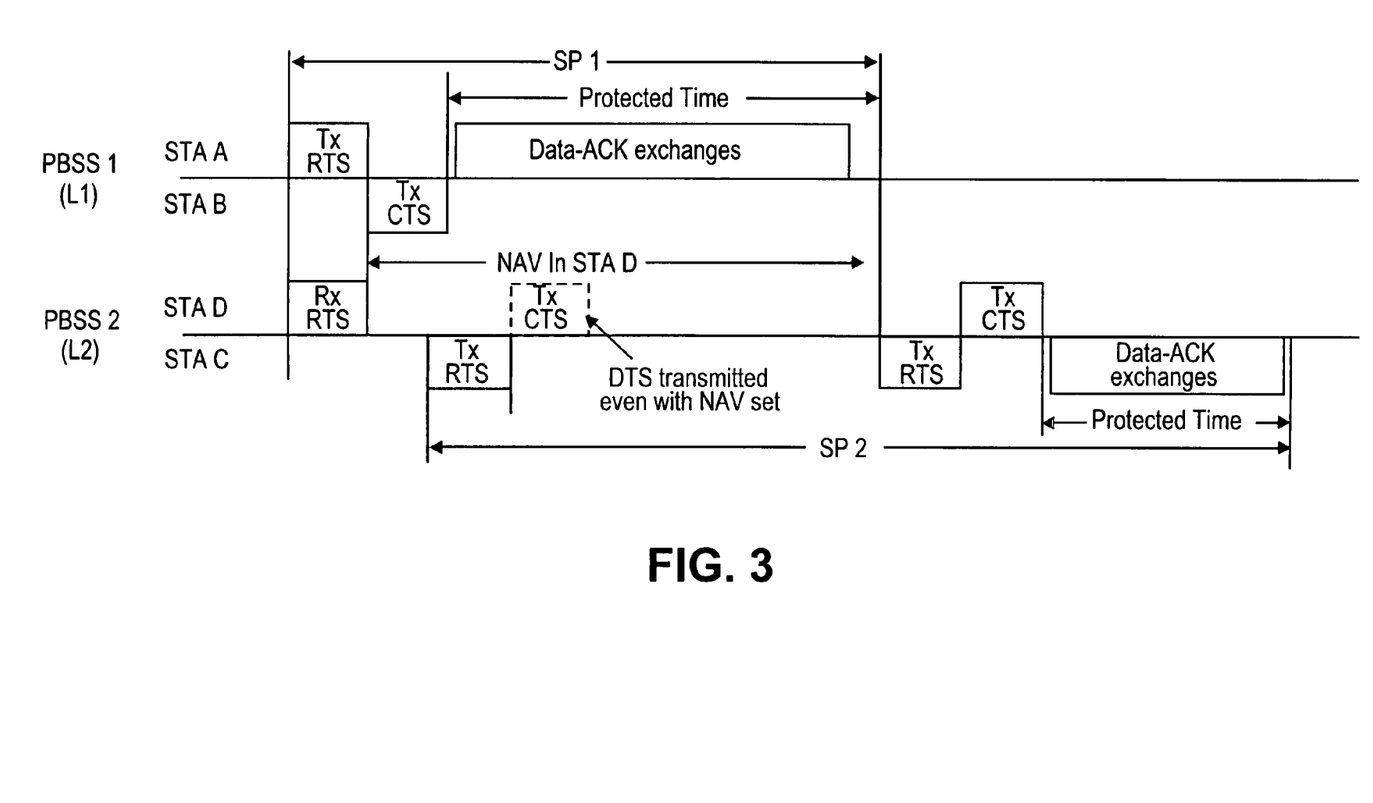
FIG. 3 shows a timing diagram of an exchange using a denial-to-send, according to an embodiment of the invention.

FIG. 3 shows a timing diagram of an exchange using a denial-to-send, according to an embodiment of the invention. The initial portions of FIG. 3 are similar to those of FIG. 2, in which STA D sets its NAV for the time period of SP1 after detecting an RTS (or CTS) from STA A, and STA C transmits its own RTS to STA D during SP1, with the intention of establishing protected communications lasting for time period SP2. However, in this embodiment STA D does not wait, but transmits a DTS while its NAV is still set. The format of the DTS is such that when STA C receives it, STA C will know that STA D has its NAV set for the duration of a time specified in the DTS, and STA C should not initiate the desired communications exchange until that time period expires. When the NAV expires, STA C may then retransmit the RTS, and STA D may respond with a CTS in the normal manner, thereby clearing the way for the desired communications exchange between STA C and STA D during the remainder of SP2.

The technique described in FIG. 3 has the advantage of informing STA C about the NAV status of STA D, so that STA C can wait for the indicated time without resorting to retransmissions or other unnecessary corrective actions. It has the disadvantage of requiring STA D to transmit while its NAV is set. Since STA D would not be able to sense a current transmission from STA B to STA A, this technique could cause STA D's transmission of the DTS to interfere with an existing transmission from STA B to STA A. Whether the technique of FIG. 2 or the technique of FIG. 3 is used, proper precautions may be taken to reduce or eliminate the stated disadvantages.

Figure 4:
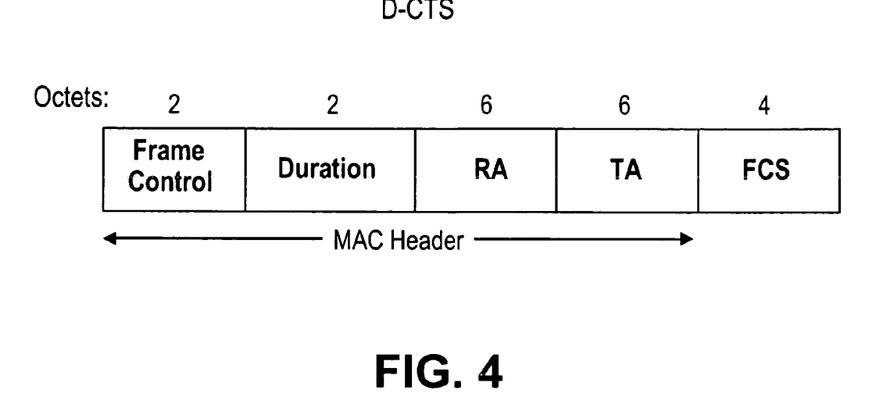
FIG. 4 shows a diagram of the format of a delayed clear-to-send, according to an embodiment of the invention.

FIG. 4 shows a diagram of the format of a delayed clear-to-send, according to an embodiment of the invention. This format indicates specific fields of a specific size with specific names, but other formats may also be used. The format shown may be part of a medium access control (MAC) header. In the illustrated example of FIG. 4, the first field is a Frame Control field, used to identify the type of frame it is. The fact that this is a D-CTS frame may be identified in this field. The second field is a Duration field, which may be used to indicate the time remaining in the service period associated with the RTS to which this D-CTS is a response. This value may be determined by taking the duration value from the RTS, and subtracting any time that has elapsed before transmission of this D-CTS. The RA and TA fields represent the network addresses of the device intended to receive this frame and the device that transmitted this frame, respectively. The FCS field is the Frame Check Sequence field, used to validate that the contents of this frame are received correctly. Note: in some embodiments, a D-CTS may be used in place of a standard CTS in some or all instances shown herein, and the terms CTS and D-CTS may be considered interchangeable for the same functional element.

Figure 5:
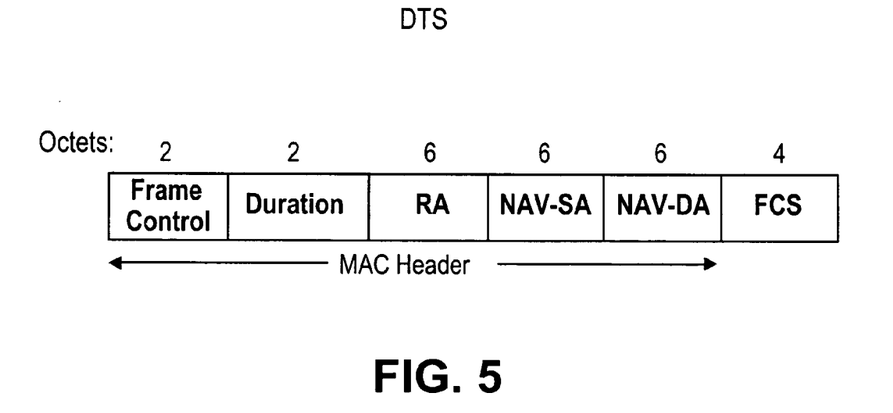
FIG. 5 shows a diagram of the format of a denial-to-send, according to an embodiment of the invention.

FIG. 5 shows a diagram of the format of a denial-to-send, according to an embodiment of the invention. Similar to the format of FIG. 4, the RA field may indicate the address of the device intended to receive this frame, and the FCS may be used to validate that the contents of this frame are received correctly. The Frame Control field may indentify this as a DTS frame. The Duration field may indicate the time remaining in the NAV of the device transmitting this frame. The NAV-SA and NAV-DA fields indicate the addresses of the source device and destination device, respectively, whose exchange of the RTS and CTS established the current NAV of the device transmitting this DTS frame. In the previous examples, NAV-SA would indicate STA A (transmitted the original RTS), and NAV-DA would indicate STA B (responded by transmitting a CTS). One of the important differences between the contents of the D-CTS and the DTS is that the Duration field of the DTS indicates how long the other device should wait before initiating the requested communication exchange, while the Duration field of the D-CTS indicates how much time the other device has to complete the requested communication exchange.

Figure 6:
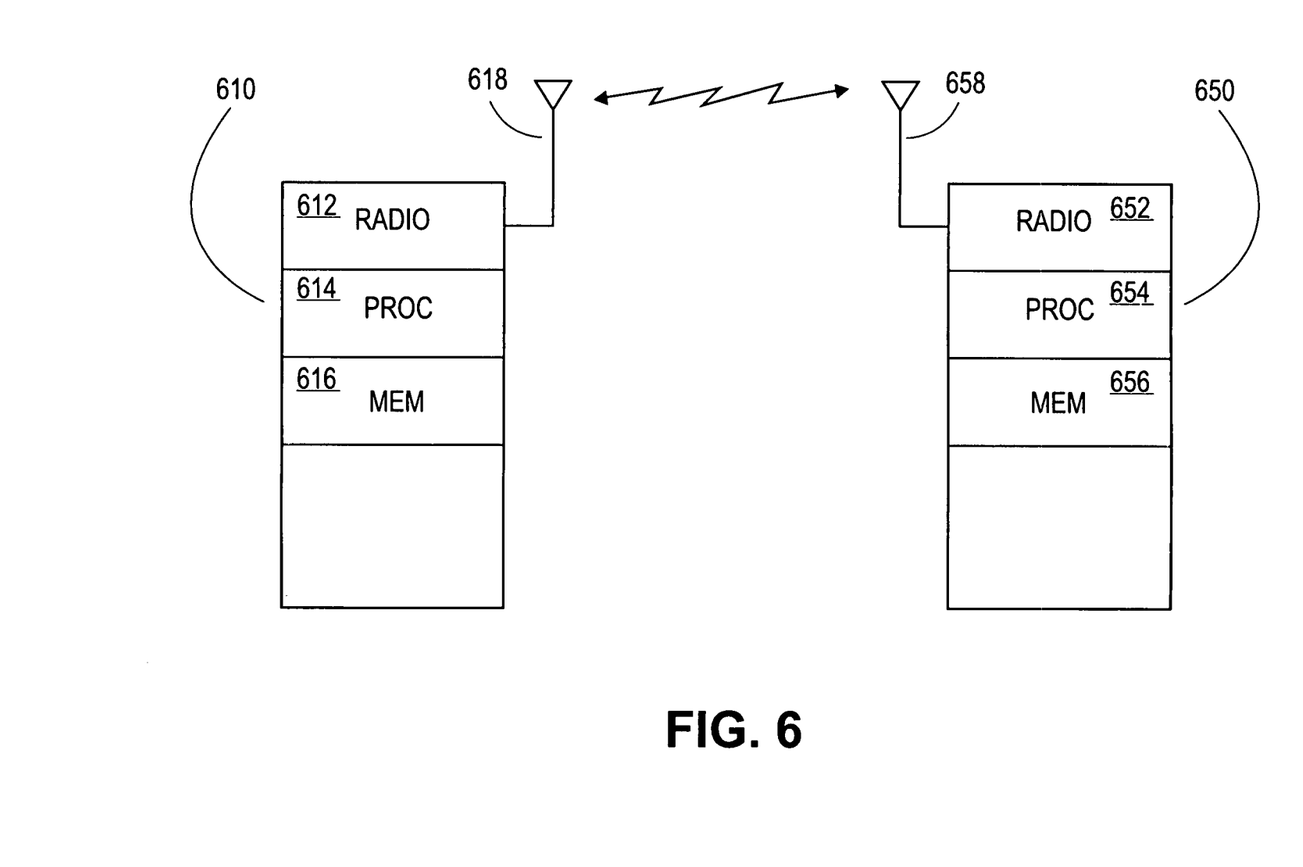
FIG. 6 shows two wireless communications devices, according to an embodiment of the invention.

FIG. 6 shows two wireless communications devices, according to an embodiment of the invention. The two devices are shown communicating with each other and therefore may be used to represent STA C and STA D, but the same internal components may be used to describe any of the communications devices described in this document. Device 610 is shown with at least one radio 612 for communicating wirelessly through at least one antenna 618, at least one processor 614 for processing information, and at least one memory 616 to hold data and instructions to be used in that processing. Device 650 is similarly shown with at least one radio 652 for communicating wirelessly through at least one antenna 658, at least one processor 654, and at least one memory 656. These items may provide the physical components that enable the functionality described elsewhere in this document.

The foregoing description is intended to be illustrative and not limiting. Variations will occur to those of skill in the art. Those variations are intended to be included in the various embodiments of the invention, which are limited only by the scope of the following claims.

What is claimed is:

1. A system, comprising:
a first device for performing wireless directional communications with a second device, the wireless directional communications comprising:
setting a network allocation vector (NAV) in response to detecting a network reservation from a third device;
receiving, during a time period indicated by the NAV, a request-to-send (RTS) from the second device;
transmitting, to the second device, either a denial-to-send (DTS) for a time period before expiration of the NAV or a delayed clear-to-send (D-CTS) for a time period after expiration of the NAV, the DTS indicating to the second device not to initiate communications until after expiration of the NAV; and
performing communications with the second device after the expiration of the NAV and after said transmitting, said communications taking place during a time period indicated by the RTS from the second device;
wherein said transmitting comprises transmitting a DTS; and
the first device is to receive a second RTS from the second device after the expiration of the NAV and is to transmit a clear-to-send (CTS) after receiving the second RTS but before said performing.

2. The system of claim 1, wherein the DTS comprises a frame control message indicating a time remaining in the NAV.

3. The system of claim 1, wherein the network reservation comprises either an RTS or a CTS transmitted by the third device and not addressed to the first device.

4. The system of claim 1, further comprising at least one antenna.

5. The apparatus of claim 1, wherein the DTS includes a Frame Control Field, a Duration field, an RA field, a NAV-SA field, a NAV-DA field, and an FCS field.

6. A method, comprising:
communicating wirelessly with a second device, by performing operations in a first device, said operations comprising:
setting a network allocation vector (NAV) in response to detecting either a request to send (RTS) from a third device or a clear-to-send (CTS) from the third device;
receiving, during a time period indicated by the NAV, a request-to-send (RTS) from the second device;
transmitting, to the second device, in response to receiving the RTS, a denial-to-send (DTS) before expiration of the NAV, the DTS indicating to the second device not to initiate communications until after expiration of the NAV;
performing communications with the second device after the expiration of the NAV, wherein said receiving, said transmitting, and said performing communications each comprise using a directional link;
receiving a second RTS from the second device after the expiration of the NAV; and
transmitting a clear-to-send (CTS) after receiving the second RTS but before said performing.

7. The method of claim 6, wherein the DTS comprises a duration field indicating a time remaining in the NAV.

8. The method of claim 6, wherein the DTS includes a Frame Control Field, a Duration field, an RA field, a NAV-SA field, a NAV-DA field, and an FCS field.

9. An article comprising:
a non-transitory computer-readable storage medium that contains non-transitory instructions, which when executed by one or more processors result in performing operations comprising:
setting a network allocation vector (NAV) in response to detecting either a request to send (RTS) from a third device or a clear-to-send (CTS) from the third device;
receiving, during a time period indicated by the NAV, a request-to-send (RTS) from the second device;
transmitting, to the second device, a denial-to-send (DTS) before expiration of the NAV, the DTS indicating to the second device not to initiate communications until after expiration of the NAV;

performing communications with the second device after the expiration of the NAV, wherein the operations of receiving, transmitting, and performing take place over a directional link;

receiving another RTS from the second device after the expiration of the NAV; and transmitting a clear-to-send (CTS) after receiving the second RTS but before said performing.

10. The article of claim 9, wherein the DTS comprises a frame control message indicating a time remaining in the NAV.

11. The article of claim 9, wherein the DTS includes a Frame Control Field, a Duration field, an RA field, a NAV-SA field, a NAV-DA field, and an FCS field.

12. A system, comprising:

a first device for performing wireless directional communications with a second device over a directional link, the first device including a radio, a processor, and a memory, the wireless directional communications comprising:

transmitting a request-to-send (RTS) to the second device;

receiving a denial-to-send (DTS) from the second device, the DTS containing a duration value indicating a time remaining for a network allocation vector (NAV) that has been set in the second device, the DTS indicating to the first device not to initiate communications until after expiration of the NAV;

performing subsequent communications with the second device only after the expiration of the NAV;

transmitting a second RTS to the second device after said expiration of the NAV; and receiving a clear-to-send (CTS) from the second device after transmitting the second RTS but before said performing the subsequent communication.

13. The system of claim 12, further comprising at least one antenna.

14. The apparatus of claim 12, wherein the DTS includes a Frame Control Field, a Duration field, an RA field, a NAV-SA field, a NAV-DA field, and an FCS field.

15. A method, comprising communicating wirelessly with a second device, by performing operations in a first device, said communicating comprising:

transmitting a request-to-send (RTS) to the second device;

receiving a denial-to-send (DTS) from the second device, the DTS containing a duration value indicating a time remaining for a network allocation vector (NAV) that has been set in the second device, the DTS indicating to the first device not to initiate communications until after expiration of the NAV;

performing subsequent communications with the second device only after the expiration of the NAV, wherein said transmitting, said receiving, and said performing each comprise using a directional link;

transmitting a second RTS to the second device after said expiration of the NAV; and receiving a clear-to-send (CTS) from the second device after transmitting the second RTS but before said performing the subsequent communication.

16. The method of claim 15, wherein the DTS comprises a frame control message.

17. The method of claim 15, wherein the DTS includes a Frame Control Field, a Duration field, an RA field, a NAV-SA field, a NAV-DA field, and an FCS field.

18. An article comprising:

a non-transitory computer-readable storage medium that contains non-transitory instructions, which when executed by one or more processors result in performing operations comprising:

transmitting a request-to-send (RTS) to a wireless communications device;

receiving a denial-to-send (DTS) from the wireless communication device, the DTS containing a duration value indicating a time remaining for a network allocation vector (NAV) that has been set, the DTS indicating not to initiate communications until after expiration of the NAV;

performing subsequent communications with the wireless communications device only after the expiration of the NAV;

transmitting a second RTS to a second device after said expiration of the NAV; and receiving a clear-to-send (CTS) from the second device after transmitting the second RTS but before said performing the subsequent communication.

19. The article of claim 18, wherein the DTS comprises a frame control message.

20. The article of claim 18, wherein the DTS includes a Frame Control Field, a Duration field, an RA field, a NAV-SA field, a NAV-DA field, and an FCS field.

* * * * *